(12) United States Patent
Rosenberger

(10) Patent No.: US 11,674,826 B2
(45) Date of Patent: Jun. 13, 2023

(54) MONITORING UNIT FOR MONITORING A LINEAR ASSET AND METHOD FOR MONITORING A LINEAR ASSET

(71) Applicant: Frauscher Sensortechnik GmbH, St. Marienkirchen (AT)

(72) Inventor: Martin Rosenberger, Eggerding (AT)

(73) Assignee: FRAUSCHER SENSORTECHNIK GMBH, St. Marienkirchen (AT)

( * ) Notice: Subject to any disclaimer, the term of this patent is extended or adjusted under 35 U.S.C. 154(b) by 0 days.

(21) Appl. No.: 15/733,849

(22) PCT Filed: May 31, 2019

(86) PCT No.: PCT/EP2019/064203
§ 371 (c)(1),
(2) Date: Nov. 30, 2020

(87) PCT Pub. No.: WO2019/229243
PCT Pub. Date: Dec. 5, 2019

(65) Prior Publication Data
US 2021/0231466 A1    Jul. 29, 2021

(30) Foreign Application Priority Data
Jun. 1, 2018    (EP) ........................ 8175568

(51) Int. Cl.
*H04L 29/08*    (2006.01)
*G01D 5/353*    (2006.01)
*H04L 67/12*    (2022.01)

(52) U.S. Cl.
CPC ......... *G01D 5/35358* (2013.01); *H04L 67/12* (2013.01)

(58) Field of Classification Search
CPC ....... G01D 5/35358; H04L 67/12; B61L 1/02; B61L 1/166; B61L 25/025; G01S 5/18; G01S 7/4818; G01S 7/497; G01H 9/004
See application file for complete search history.

(56) References Cited

U.S. PATENT DOCUMENTS

2018/0029619 A1    2/2018  Rosenberger et al.
2018/0354534 A1*  12/2018  Cole ...................... B61L 23/30
(Continued)

FOREIGN PATENT DOCUMENTS

CN    104266084 A    1/2015
EP    3275763 A1     1/2018
(Continued)

OTHER PUBLICATIONS

English language translation of Chinese Search Report in Application No. 2019800365196 dated Mar. 14, 2022, 2 pages.
(Continued)

*Primary Examiner* — Kim T Nguyen
(74) *Attorney, Agent, or Firm* — Morgan, Lewis & Bockius LLP

(57) ABSTRACT

A monitoring unit for monitoring a linear asset includes a connection to a data output of a distributed sensor arranged along the linear asset, where the linear asset has a length which is different from the length of the distributed sensor, and a processing unit which is configured to receive a data signal provided by the distributed sensor, to apply a transfer function, to evaluate the data signal and to provide a tracking output signal. Evaluating the data signal includes running an evaluation algorithm, the transfer function is applied to the data signal or to the evaluation algorithm, and by applying the transfer function, the data signal or the evaluation algorithm is normalized. Furthermore, a method for monitoring a linear asset is provided.

18 Claims, 6 Drawing Sheets

(56) References Cited

U.S. PATENT DOCUMENTS

2019/0197846 A1* 6/2019 Englund .............. G08B 13/186
2019/0204423 A1* 7/2019 O'Keeffe ................ G01S 17/89

FOREIGN PATENT DOCUMENTS

| WO | WO 2013114135 | * | 8/2013 |
| WO | WO-2013114135 A2 | | 8/2013 |
| WO | WO-2017093741 A1 | | 6/2017 |
| WO | WO-2018045433 A1 | | 3/2018 |

OTHER PUBLICATIONS

English language translation of Chinese Office Action in Application No. 2019800365196 dated Mar. 18, 2022, 7 pages (including translation).

Chinese Office Action in Application No. 201980036519.6 dated Nov. 2, 2022, 13 pages (including translation).

* cited by examiner

FIG 8

$$\begin{bmatrix} P & ds \\ 1 & 0 \\ 2 & 51,5 \\ 3 & 103 \\ 4 & 114,5 \\ 5 & 126 \\ 6 & 136 \\ 7 & 146 \\ 8 & 149,5 \\ 9 & 153 \\ 10 & 173 \end{bmatrix} \Rightarrow \begin{bmatrix} P & n \\ 1 & 0 \\ 2 & 50 \\ 3 & 100 \\ 4 & 100 \\ 5 & 100 \\ 6 & 110 \\ 7 & 120 \\ 8 & 120 \\ 9 & 120 \\ 10 & 140 \end{bmatrix} \Rightarrow \begin{bmatrix} P & d \\ 1 & 0 \\ 2 & 50 \\ 3 & 100 \\ 4 & 100 \\ 5 & 100 \\ 6 & 110 \\ 7 & 120 \\ 8 & 120 \\ 9 & 120 \\ 10 & 140 \end{bmatrix}$$

FIG 9

$$\begin{bmatrix} P & ds \\ 1 & 0 \\ 2 & 51,5 \\ 3 & 103 \\ 4 & 114,5 \\ 5 & 126 \\ 6 & 136 \\ 7 & 146 \\ 8 & 149,5 \\ 9 & 153 \\ 10 & 173 \end{bmatrix} \Rightarrow \begin{bmatrix} P & n \\ 1 & 0 \\ 2 & -1,5 \\ 3 & -3 \\ 4 & -14,5 \\ 5 & -26 \\ 6 & -26 \\ 7 & -26 \\ 8 & -29,5 \\ 9 & -33 \\ 10 & -33 \end{bmatrix} \Rightarrow \begin{bmatrix} P & d \\ 1 & 0 \\ 2 & 50 \\ 3 & 100 \\ 4 & 100 \\ 5 & 100 \\ 6 & 110 \\ 7 & 120 \\ 8 & 120 \\ 9 & 120 \\ 10 & 140 \end{bmatrix}$$

FIG 10

|  P  |  ds   |  x   |  A   |
|-----|-------|------|------|
|  1  |  0    |  0   | 100  |
|  2  | 51,5  | 11,5 | 45,2 |
|  3  | 103   | 23   | 20,4 |
|  4  | 114,5 | 11,5 | 45,2 |
|  5  | 126   | 0    | 100  |
|  6  | 136   | 0    | 100  |
|  7  | 146   | 0    | 100  |
|  8  | 149,5 | 3,5  | 78,5 |
|  9  | 153   | 7    | 61,7 |
| 10  | 173   | 7    | 61,7 |

$\Rightarrow$

|  P  |  nd   |  nA  |
|-----|-------|------|
|  1  |  0    | 1,0  |
|  2  | -1,5  | 2,2  |
|  3  | -3    | 4,9  |
|  4  | -14,5 | 2,2  |
|  5  | -26   | 1,0  |
|  6  | -26   | 1,0  |
|  7  | -26   | 1,0  |
|  8  | -29,5 | 1,3  |
|  9  | -33   | 1,6  |
| 10  | -33   | 1,6  |

$\Rightarrow$

|  P  |  d  |  A  |
|-----|-----|-----|
|  1  |  0  | 100 |
|  2  | 50  | 100 |
|  3  | 100 | 100 |
|  4  | 100 | 100 |
|  5  | 100 | 100 |
|  6  | 110 | 100 |
|  7  | 120 | 100 |
|  8  | 120 | 100 |
|  9  | 120 | 100 |
| 10  | 140 | 100 |

MONITORING UNIT FOR MONITORING A LINEAR ASSET AND METHOD FOR MONITORING A LINEAR ASSET

TECHNICAL FIELD

The present application relates to a monitoring unit for monitoring a linear asset and to a method for monitoring a linear asset.

BACKGROUND

A monitoring unit can comprise a distributed sensor which is arranged along a linear asset. The distributed sensor can be employed to detect signals at or around the linear asset. The signal can for example be an acoustic signal. As the distributed sensor is arranged along the linear asset, the position of a detected signal along the linear asset can be determined.

However, it is possible that the distributed sensor is not perfectly aligned with the linear asset. For example, the distance between the distributed sensor and the linear asset can vary over the length of the linear asset. It is further possible, that the total length of the distributed sensor is different from the total length of the linear asset. Therefore, the accuracy of determining the position of a detected signal can be decreased.

SUMMARY

It is an objective to provide a monitoring unit for monitoring a linear asset with an improved accuracy. It is further an objective to provide a method for monitoring a linear asset with an improved accuracy.

These objectives are achieved with the independent claims. Further embodiments are the subject of dependent claims.

In at least one embodiment of the monitoring unit for monitoring a linear asset, the monitoring unit comprises a connection to a data output of a distributed sensor arranged along the linear asset, where the linear asset has a length which is different from the length of the distributed sensor. The distributed sensor can be arranged in the environment of the linear asset. This means, the distributed sensor can be arranged close to the linear asset. The distributed sensor can further extend along the linear asset. The distributed sensor can have a sensor length. The linear asset can have an asset length. The distance between the distributed sensor and the linear asset can vary along the length of the linear asset. The distributed sensor can be arranged to provide the position of an object along the sensor length. The distributed sensor can be a linear sensor. The linear asset can for example be a railway track where rail vehicles are objects to be detected. It is further possible that the linear asset is a pipeline, a road or a fence. Thus, the sensor length can be in the range of several kilometers or several hundreds of kilometers.

That the linear asset has a length which is different from the length of the distributed sensor can mean, that the sensor length can be longer than the asset length. It is further possible that the sensor length is shorter than the asset length. The distributed sensor can be arranged in the vicinity of the linear asset. This can mean, that the distributed sensor is arranged within the ground in the vicinity of the linear asset. Due to differences in the environment of the linear asset along the asset length, the distance between the distributed sensor and the linear asset can vary along the asset length. Furthermore, for example in places where the linear asset has a curved shape, the distributed sensor can be arranged along a curve with a different radius, which means that the sensor length differs from the asset length.

The monitoring unit further comprises a processing unit which is configured to receive a data signal provided by the distributed sensor, to apply a transfer function, to evaluate the data signal and to provide a tracking output signal. The data signal can be provided by the distributed sensor at the data output. The data signal can comprise information about a signal which is detected along the distributed sensor. The data signal can further provide information about the position at which the signal is detected along the sensor length.

The transfer function can comprise information about the sensor length. The transfer function can further comprise information about differences between the sensor length and the asset length. For example, the transfer function can comprise information about the distance between the distributed sensor and the linear asset for a plurality of positions along the linear asset. The transfer function can be a linear or any other function. It is further possible that the transfer function is a matrix or a combination of several matrices.

Evaluating the data signal comprises running an evaluation algorithm. That the data signal is evaluated can mean that the data signal is analysed by the processing unit. For example the processing unit can be configured to identify a pattern in the data signal by running the evaluation algorithm. It is further possible to classify one or more patterns in the data signal by running the evaluation algorithm. This means, that the processing unit can be configured to relate one or more patterns in the data signal to one or more events along the linear asset. It is further possible that the processing unit is configured to determine further parameters of the detected events. The events along the linear asset can for example be moving objects, as trains, vehicles, persons or animals, conditions of the linear asset itself or other events in the vicinity of the linear asset.

The transfer function is applied to the data signal or to the evaluation algorithm. Applying the transfer function to the data signal can mean, that the data signal is multiplied with the transfer function. It is further possible that the transfer function is applied to the data signal by another mathematical operation. Alternatively, the transfer function is applied to the evaluation algorithm.

By applying the transfer function the data signal or the evaluation algorithm is normalised.

The tracking output signal can comprise a normalised data signal. The tracking output signal can further comprise information determined by the processing unit as for example information about events along the linear asset which are detected by the processing unit. The processing unit can comprise an output at which the tracking output signal can be provided.

For the case that the data signal is normalised by applying the transfer function the processing unit comprises a normalisation unit which comprises a normalisation input which is configured to receive the data signal. The data signal can be a digital signal. The normalisation unit is configured to apply the transfer function to the data signal. By applying the transfer function to the data signal the data signal is normalised. The normalisation unit can further be configured to provide a normalisation output signal. The normalisation output signal can comprise the normalised data signal. The normalisation unit can comprise an output at which a normalisation output signal can be provided.

The monitoring unit can further comprise a tracking unit which is configured to evaluate the normalisation output signal provided by the normalisation unit. The tracking unit can be configured to analyze the normalisation output signal. For example the tracking unit can be configured to identify a pattern in the normalisation output signal. The tracking unit can be further configured to classify one or more patterns in the normalisation output signal. This means, that the tracking unit can be configured to relate one or more patterns in the normalisation output signal to one or more events along the linear asset. It is further possible that the tracking unit is configured to determine further parameters of the detected events.

For the case that the evaluation algorithm is normalised by applying the transfer function, the data signal is provided to the evaluation algorithm by the processing unit. The evaluation algorithm can for example be normalised by normalising threshold levels of the evaluation algorithm. The threshold levels can be employed to evaluate the data signal. The evaluation algorithm can be an adaptive algorithm which is capable of distinguishing repeating features in the data signal. This means, the evaluation algorithm can for example be a machine learning algorithm.

For monitoring a linear asset it is often desired to obtain information about events along the linear asset. For example, it can be of interest at which position a particular event occurs along the linear asset. The distributed sensor can be capable of providing the position of an event detected along the distributed sensor. By employing the processing unit in the monitoring unit the events detected along the sensor length can be correlated to their position along the linear asset. Therefore, by normalising the data signal, the accuracy of the monitoring of the linear asset is improved.

In particular, the data signal is normalised by applying the transfer function to the data signal or the evaluation algorithm is normalised by applying the transfer function to the evaluation algorithm.

Advantageously, employing the processing unit enables a normalisation of the data signal for a variety of different arrangements of the distributed sensor and the linear asset. If the distributed sensor comprises spare sections which are stored as a replacement for the case that a part of the distributed sensor needs to be exchanged, the data signal can be normalised by not taking into account the spare sections. In addition, if the distributed sensor does not extend parallel to the linear asset but at an angle, the data signal can be normalised for each position along the linear asset.

In at least one embodiment of the monitoring unit, the transfer function comprises normalisation factors for normalising the data signal or the evaluation algorithm. As the sensor length is different from the asset length, signals detected along the sensor length cannot be allocated to a position along the asset length without taking into account the difference between the sensor length and the asset length. The transfer function can be formed with values from a normalisation database. The normalisation database comprises information that correlate a position along the linear asset with their respective closest position along the distributed sensor. The difference between the sensor length and the asset length can be determined for a plurality of positions along the asset length. The normalisation database can comprise the information about these differences.

The normalisation factors can be determined from the normalisation database. The normalisation factors can be determined in such a way that by applying the transfer function, the data signal or the evaluation algorithm is normalised with respect to the length of the linear asset. This can mean that for a plurality of positions along the distributed sensor each normalisation factor correlates a position along the distributed sensor with the respective closest position along the linear asset. In other words, for a plurality of positions along the distributed sensor each normalisation factor is the difference between the distance between two positions along the linear asset and the distance between the two positions along the distributed sensor that are the closest to the two positions along the linear asset.

In at least one embodiment of the monitoring unit, the normalisation factors of the transfer function are determined in such a way that by applying the transfer function, the data signal or the evaluation algorithm is normalised with respect to the length of the linear asset, and/or the normalisation factors of the transfer function are determined in such a way that by applying the transfer function, the data signal or the evaluation algorithm is normalised with respect to the acoustic frequency response function of the environment of the linear asset.

That the normalisation factors of the transfer function are determined in such a way that by applying the transfer function, the data signal or the evaluation algorithm is normalised with respect to the length of the linear asset can mean that for a plurality of positions along the distributed sensor each normalisation factor correlates a position along the distributed sensor with the respective closest position along the linear asset. In other words, for a plurality of positions along the distributed sensor each normalisation factor is the difference between the distance between two positions along the linear asset and the distance between the two positions along the distributed sensor that are the closest to the two positions along the linear asset.

Furthermore, the amplitude of a signal detected by the distributed sensor depends on the acoustic frequency response function of the environment of the linear asset. The acoustic frequency response function of a material describes how acoustic waves are transmitted by the material. The materials in the environment of the linear asset can change and can have different acoustic frequency response functions. Another expression for acoustic frequency response function is acoustic transfer function. The normalisation database can further comprise information about the acoustic frequency response function of the environment of the linear asset. This means, the normalisation factors can comprise information about the acoustic frequency response function of the environment of the linear asset. The normalisation factors of the transfer function can be determined in such a way that by applying the transfer function, the data signal or the evaluation algorithm is normalised with respect to the acoustic frequency response function of the environment of the linear asset.

Among other factors the acoustic frequency response depends on the distance between the linear asset and the distributed sensor. Therefore, normalising the data signal or the evaluation algorithm with respect to the acoustic frequency response function of the environment of the linear asset can comprise determining the distance between the linear asset and the distributed sensor for a plurality of positions. For each of these positions a normalisation factor gives the factor by which the amplitude of the data signal is reduced due to the distance between the linear asset and the distributed sensor under the assumption that the data signal detects noise along the linear asset 21. Consequently, the normalisation factors can be employed to normalise the data signal or the evaluation algorithm with respect to the acoustic frequency response function of the environment of the linear asset.

For a plurality of positions along the distributed sensor each normalisation factor can be the inverse of the factor by which the amplitude of the data signal is reduced at the respective position along the distributed sensor in comparison to the respective closest position along the linear asset.

In at least one embodiment of the monitoring unit, the normalisation factors of the transfer function are determined in such a way that by applying the transfer function, the data signal or the evaluation algorithm is normalised with respect to the distance between the linear asset and the distributed sensor. The amplitude of a signal detected by the distributed sensor depends on the distance between the distributed sensor and the linear asset at the position where the signal is detected. Therefore, the amplitude of a signal detected by the distributed sensor depends on both the amplitude of the signal and the distance between the distributed sensor and the linear asset. The normalisation database can further comprise information about the distance between the distributed sensor and the linear asset for a plurality of positions. After normalising the data signal or the evaluation algorithm to the distance between the linear asset and the distributed sensor, the tracking output signal can provide information about the amplitude of noise detected along the linear asset, wherein the amplitude does not depend on the distance between the linear asset and the distributed sensor.

It is possible for the data signal or the evaluation algorithm to be normalised with respect to the length of the linear asset, with respect to the distance between the linear asset and the distributed sensor, or with respect to the acoustic frequency response function of the environment of the linear asset. In all cases the accuracy of the monitoring of the linear asset is improved. The accuracy can be further improved by normalising the data signal or the evaluation algorithm with respect to the length of the linear asset and/or the distance between the linear asset and the distributed sensor, and the acoustic frequency response function of the environment of the linear asset.

In at least one embodiment of the monitoring unit, by applying the transfer function the data signal or the evaluation algorithm is normalised with respect to at least one of the following:
the length of the linear asset,
the distance between the linear asset and the distributed sensor,
the acoustic frequency response function of the environment of the linear asset.

The data signal provided by the distributed sensor can provide information about a signal detected along the sensor length. The data signal can be configured to provide the information at which position along the sensor length the signal is detected. After normalising the data signal or the evaluation algorithm to the asset length the tracking output signal can provide the information at which position along the asset length the signal is detected.

This means, applying the transfer function enables a normalisation of the data signal or the evaluation algorithm with respect to different parameters of the linear asset and the environment of the linear asset. Therefore, by normalising the data signal or the evaluation algorithm, the accuracy of the monitoring of the linear asset is improved. Furthermore, other parameters which can be determined from the normalised data signal or the normalised evaluation algorithm, as for example the velocity of a vehicle moving along the linear asset, can be determined with an improved accuracy due to the normalisation.

In at least one embodiment of the monitoring unit, by applying the transfer function the data signal or the evaluation algorithm is normalised with respect to the length of the linear asset, the distance between the linear asset and the distributed sensor, and the acoustic frequency response function of the environment of the linear asset.

In at least one embodiment of the monitoring unit, the distributed sensor is a distributed acoustic sensor. This means, the distributed sensor can comprise an optical fibre. The distributed acoustic sensor can be arranged to detect vibrations and noise on and around the linear asset.

In at least one embodiment of the monitoring unit, the distributed sensor comprises an optical fibre. The optical fibre can be arranged along or close to the linear asset. The distributed sensor can further comprise a light source, for example a laser, where light pulses are sent into the optical fibre. A small part of the light is reflected back to the light source since the light is scattered at scatter sites, as for example impurities in the optical fibre which can be natural or artificial. Changes in the backscattered signal are related to physical changes in the optical fibre which can be caused by noise, structure-borne noise, vibrations or soundwaves along the optical fibre. As the optical fibre can be arranged along the linear asset, the distributed sensor is capable of detecting noise along the linear asset. By evaluating the backscattered signal, the location of the noise along the optical fibre can be determined. With this, vibrations and noise on and around the linear asset can be monitored in real time.

In at least one embodiment of the monitoring unit, the data signal is a backscattered signal of an input signal which is provided to the optical fibre. The input signal can be a pulse of a light source, for example a laser pulse. The pulse of the light source is backscattered in the optical fibre and is detected as an analog signal. The analog backscattered signal can be converted into a digital signal which can be the data signal. Therefore, the data signal is a backscattered signal of the input signal.

In at least one embodiment of the monitoring unit, the tracking output signal comprises information about noise along the linear asset. The distributed sensor can be capable of detecting noise along the linear asset and the data signal can comprise information about noise detected by the distributed sensor. The tracking output signal can depend on the data signal. In order to monitor the linear asset it is advantageous to detect noise along the linear asset. By evaluating the tracking output signal information about the noise along the linear asset can be obtained.

In at least one embodiment of the monitoring unit, the linear asset is one of a railway track, a pipeline, a road or a fence. Railway tracks, pipelines, roads or fences can extend over long distances of several hundreds of kilometers. It is therefore advantageous to monitor these linear assets. On and/or along these linear assets for example rail vehicles, other vehicles, people, construction work, animals or environmental events such as rock falls and landslides can be monitored.

In at least one embodiment of the monitoring unit, the processing unit is capable of providing the current position of an object moving along the linear asset. From the backscattered signal or from the data signal the position of noise along the distributed sensor can be determined. The data signal is normalised with respect to the length of the linear asset. In this way, the position of an object moving along the linear asset, as for example a rail vehicle moving on a railway track, can be determined. For the traffic of rail vehicles on the railway track it is advantageous to know the position of each rail vehicle moving on the railway track. It is furthermore advantageous to detect other noise around and on the railway track, as for example humans or animals moving on the railway track.

In at least one embodiment of the monitoring unit, the data signal comprises position information which relates to positions along the distributed sensor. This can mean, that the data signal is detected for positions along the distributed sensor. For example, the data comprised by the data signal relates to positions along the distributed sensor. That the data signal comprises position information can further mean, that the position of noise detected by the distributed sensor can be determined from the data signal.

In at least one embodiment of the monitoring unit, the tracking output signal comprises normalised position information which relates to positions along the linear asset. The data signal is detected along the distributed sensor. This means, noise occurring along the distributed sensor can be detected. As the distributed sensor is arranged in the vicinity of the linear asset the detected noise also occurs along the linear asset. In order to relate the noise detected along the distributed sensor to positions along the linear asset, the data signal or the evaluation algorithm is normalised with respect to the length of the linear asset. Therefore, the tracking output signal comprises normalised position information, where the position of detected noise relates to a position along the linear asset. Advantageously, the monitoring unit enables to relate noise detected along the distributed sensor to noise occurring in the vicinity of or on the linear asset.

In at least one embodiment of the monitoring unit, the data signal comprises an array of amplitude values where each amplitude value relates to one position along the distributed sensor. The amplitude values can relate to the amplitude of the backscattered signal at the respective position. The backscattered signal can comprise amplitude values for a plurality of positions along the optical fibre. The amplitude values can for example be larger at positions where noise is present in the vicinity of the distributed sensor than at positions where no noise is present. Therefore, the data signal comprises an array of amplitude values which relate to the amplitude of the backscattered signal. This means, the data signal can comprise the amplitude values detected by the distributed sensor. By evaluating the amplitude values events occurring along the distributed sensor can be identified and/or classified. For example, the amplitude values can be larger at a position where a rail vehicle is moving than at positions where no rail vehicle is moving. Therefore, by evaluating the amplitude values the position of a rail vehicle or other objects moving along the distributed sensor can be determined.

In at least one embodiment of the monitoring unit, the distributed sensor comprises at least one spare section and normalising the data signal or the evaluation algorithm with respect to the length of the linear asset comprises discarding the amplitude values which relate to the spare section of the distributed sensor. This can mean that the amplitude values which relate to the spare section of the distributed sensor are not taken into account by the processing unit when evaluating the tracking output signal. The distributed sensor can comprise at least one spare section or replacement section for the case that the distributed sensor needs to be repaired or a part of the distributed sensor needs to be exchanged. Thus, the distributed sensor can have a sensor length which is longer than the length of the linear asset. A spare section can for example be arranged as a spool of the optical fibre at a fixed position. Therefore, noise detected along one spare section relates to noise detected at only one position. For normalising the data signal or the evaluation algorithm with respect to the length of the linear asset it is thus required to discard the amplitude values which relate to spare sections of the distributed sensor.

In at least one embodiment of the monitoring unit, the tracking output signal comprises an array of normalised amplitude values where each normalised amplitude value relates to one position along the linear asset. This means, the amplitude values can be normalised by applying the transfer function to the data signal. The amplitude values comprised by the backscattered signal relate to positions along the distributed sensor. As the linear asset has a length which is different from the length of the distributed sensor, the amplitude values do not necessarily relate to the same positions along the linear asset as along the distributed sensor. The amplitude values can for example be normalised by taking into account that the distance between the linear asset and the distributed sensor can vary along the sensor length. For example, the amplitude values can be decreased due to an increased distance between the linear asset and the distributed sensor.

The normalisation factors of the transfer function can be determined in such a way that by applying the transfer function to the data signal the amplitude values are normalised with respect to the distance between the linear asset and the distributed sensor. Therefore, the normalised amplitude values relate to the amplitude of noise at positions along the linear asset. From the amplitude of noise along the linear asset different parameters of the event causing the noise can be determined. For example, the amplitude values provide information about the noise level of the event at the respective position along the linear asset. In the case that the linear asset is a railway track, the amplitude values at the position of a moving rail vehicle are larger than at a position where a person is walking next to the railway track. Thus, by normalising the amplitude values events occurring along the linear asset can be identified and/or classified with an improved accuracy.

In at least one embodiment of the monitoring unit, the monitoring unit further comprises a comparator unit. The comparator unit is described in the European patent application EP 18157826.1, the disclosure content of which is hereby incorporated by reference. The comparator unit can be configured to receive the data signal provided by the distributed sensor, to compare the data signal with at least one predefined pattern and to provide a digital output signal. The processing unit can be configured to receive the digital output signal provided by the comparator. The comparator unit can be configured to provide the data which is required by the processing unit in order to determine the position of noise along the linear asset. Advantageously, the digital output signal only comprises the data which is required by the processing unit.

The monitoring unit can further comprise a further normalisation unit. The further normalisation unit can be configured to receive the data signal and to apply a further transfer function to the data signal. By applying a further transfer function to the data signal the data signal is corrected with respect to the length of the linear asset. This means, position information and amplitude values of the data signal which relate to spare sections of the distributed sensor are deleted from the data signal or discarded. Afterwards, the data signal can be provided to the comparator unit. The digital output signal of the comparator unit is received by the processing unit.

Furthermore, a method for monitoring a linear asset is provided. The monitoring unit can preferably be employed in the methods described herein. This means all features disclosed for the monitoring unit are also disclosed for the method for monitoring a linear asset and vice-versa.

According to at least one embodiment of the method for monitoring a linear asset, the method comprises the step of detecting a data signal by a distributed sensor which is arranged along the linear asset, where the linear asset has a length which is different from the length of the distributed sensor. The distributed sensor can comprise a detector which is configured to detect the backscattered signal. The backscattered signal is an analog signal which can be converted into a digital signal before providing the data signal to the processing unit.

The method further comprises the step of receiving the data signal by a processing unit. The processing unit can comprise an input at which the data signal is received.

The method further comprises the step of applying a transfer function. The transfer function is applied by the processing unit.

The method further comprises the step of evaluating the data signal. The data signal is evaluated by the processing unit. Evaluating the data signal comprises running an evaluation algorithm.

The method further comprises the step of providing a tracking output signal by the processing unit. The processing unit can comprise an output at which the tracking output signal can be provided.

The transfer function is applied to the data signal or to the evaluation algorithm, and by applying the transfer function the data signal or the evaluation algorithm is normalised.

By normalising the data signal or the evaluation algorithm the events detected along the sensor length can be correlated to their position along the linear asset. Therefore, by normalising the data signal or the evaluation algorithm the accuracy of the monitoring of the linear asset is improved.

According to at least one embodiment of the method by applying the transfer function the data signal or the evaluation algorithm is normalised with respect to at least one of the following:
the length of the linear asset,
the distance between the linear asset and the distributed sensor,
the acoustic frequency response function of the environment of the linear asset.

BRIEF DESCRIPTION OF DRAWINGS

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

Figure 2:
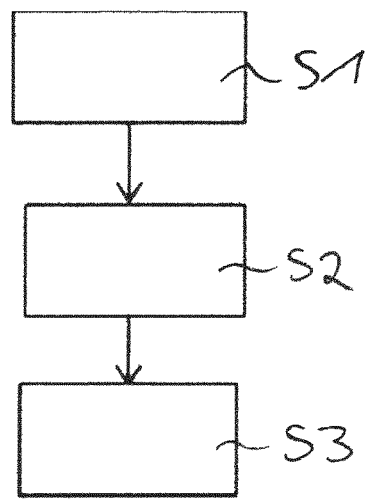

With FIG. 2 an exemplary embodiment of the method for monitoring a linear asset is described.

Figure 3:
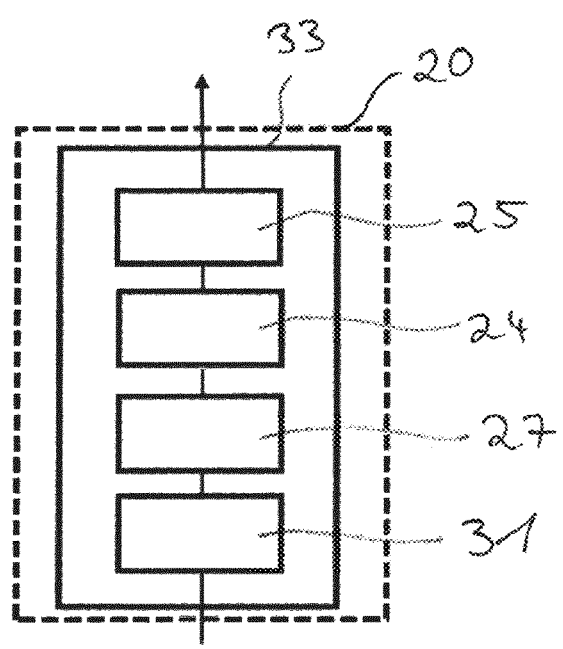

In FIG. 3 a further exemplary embodiment of the monitoring unit is shown.

In FIGS. 4, 5, 6 and 7 differently shaped linear assets and a distributed sensor are shown.

FIGS. 8, 9 and 10 show steps of exemplary embodiments of the method for monitoring a linear asset.

DETAILED DESCRIPTION

Figure 1:
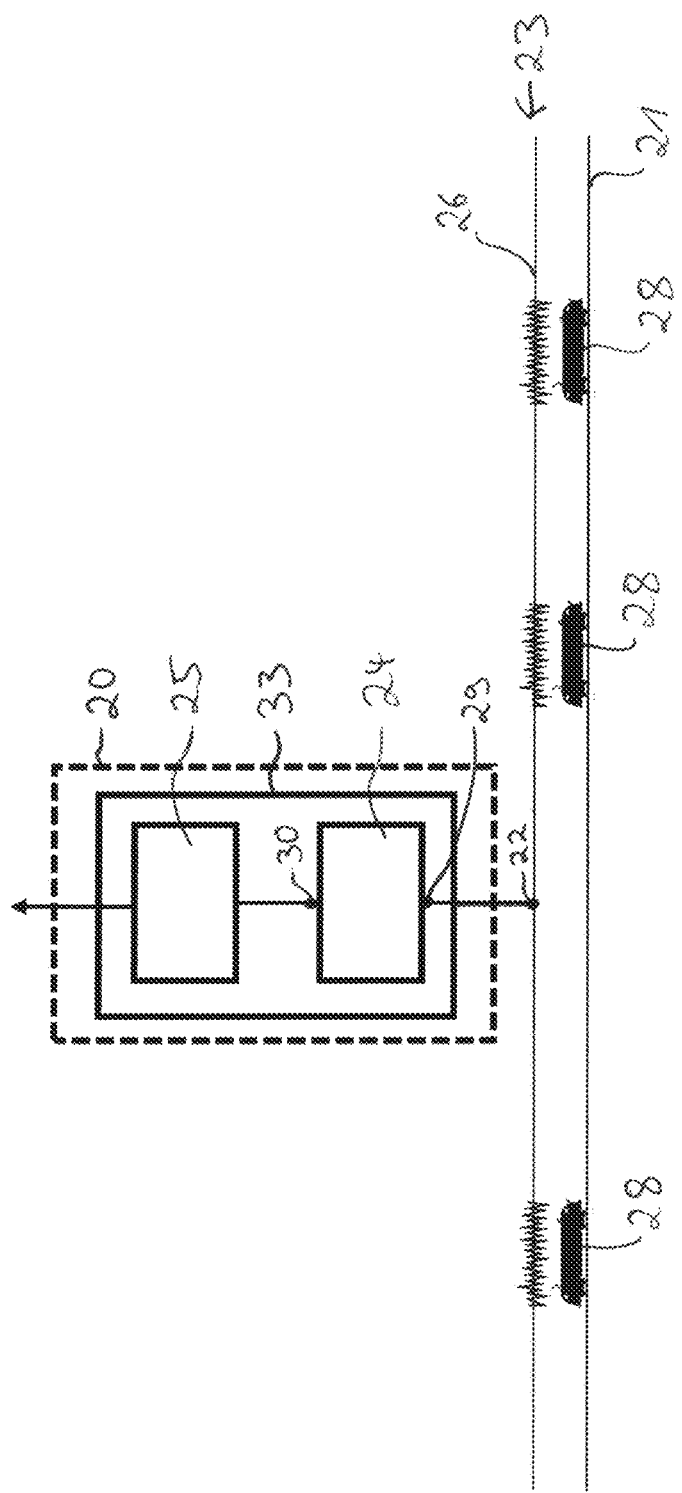
In FIG. 1 an exemplary embodiment of a monitoring unit is shown.

FIG. 1 shows an exemplary embodiment of a monitoring unit 20 for monitoring a linear asset 21. The monitoring unit 20 comprises a connection to a data output 22 of a distributed sensor 23 which is arranged along the linear asset 21. The distributed sensor 23 comprises an optical fibre 26. The optical fibre 26 is arranged along the linear asset 21 which is a railway track. On the railway track rail vehicles 28 can move. The monitoring unit 20 further comprises a processing unit 33 which is configured to receive a data signal provided by the distributed sensor 23 and to run an evaluation algorithm. The processing unit 33 comprises a normalisation unit 24 which comprises a normalisation input 29 that is configured to receive the data signal. The data signal is a backscattered signal of an input signal which is provided to the optical fibre 26. The amplitude of the backscattered signal relates to noise along the linear asset 21. Along the optical fibre 26 the amplitude of the backscattered signal is plotted schematically. At the position where a rail vehicle 28 is moving the amplitude of the backscattered signal is increased in comparison to the regions where no rail vehicle 28 is moving. Thus, the data signal comprises position information which relates to positions along the distributed sensor 23. The data signal further comprises an array of amplitude values where each amplitude value relates to one position along the distributed sensor 23. Therefore, by analyzing the backscattered signal the position of the rail vehicle 28 moving along the linear asset 21 can be determined.

The processing unit 33 is further configured to apply a transfer function and to provide a tracking output signal. The transfer function comprises normalisation factors for normalising the data signal or the evaluation algorithm. The data signal is normalised by the normalisation unit 24. The normalisation unit 24 is configured to provide a normalisation output signal which comprises the normalised data signal. The normalisation output signal is provided at a normalisation output 30 of the normalisation unit 24. The normalisation output signal can comprise normalised position information which relates to positions along the linear asset 21. The normalisation output signal can further comprise an array of normalised amplitude values where each normalised amplitude value relates to one position along the linear asset 21.

The linear asset 21 has a length which is different from the length of the distributed sensor 23. Therefore, the data signal can be normalised with respect to the length of the linear asset 21. How the length of the linear asset 21 can deviate from the length of the distributed sensor 23 is shown with FIGS. 4 to 7.

The monitoring unit 20 further comprises a tracking unit 25 which is configured to evaluate the normalisation output signal provided by the normalisation unit 24. The tracking unit 25 is configured to provide a tracking output signal which comprises information about noise along the linear asset 21. Thus, the tracking unit 25 is capable of providing the current position of a rail vehicle 28 on the railway track.

With FIG. 2 an exemplary embodiment of the method for monitoring a linear asset 21 is described. In a first step S1 the data signal is detected by the distributed sensor 23. In a second step S2 the processing unit 33 receives the data signal and the transfer function is applied by the processing unit 33. This means, the data signal or the evaluation algorithm is normalised. The data signal or the evaluation algorithm is normalised with respect to at least one of the length of the linear asset 21, the distance between the linear asset 21 and the distributed sensor 23 and the acoustic frequency response function of the environment of the linear asset 21. Furthermore, the data signal is evaluated by running the evaluation algorithm. The data signal or the evaluation algorithm can be normalised by applying the transfer function. In a next step S3 the processing unit 33 provides the tracking output signal which comprises information about noise along the linear asset 21.

In FIG. 3 a further exemplary embodiment of the monitoring unit 20 is shown. The monitoring unit 20 comprises a further normalisation unit 31. The further normalisation unit 31 is configured to receive the data signal and to apply a further transfer function to the data signal. By applying the further transfer function to the data signal the position information and/or amplitude values of the data signal which relate to spare sections 32 of the distributed sensor 23 are deleted. The further normalisation unit 31 is connected to a comparator unit 27 of the monitoring unit 20. The comparator unit 27 is arranged to receive the data signal which is normalised by the further normalisation unit 31. In addition, the comparator unit 27 is configured to compare the data signal with at least one predefined pattern and to provide a digital output signal where the digital output signal depends on the predefined pattern and on the data signal. If the tracking unit 25 is not required to be provided with the complete data signal which is provided by the distributed sensor 23, the comparator unit 27 can advantageously be arranged to provide the digital output signal comprising the data which is required by the tracking unit 25.

The comparator unit 27 is connected with the normalisation unit 24. The normalisation unit 24 is configured to receive the digital output signal and to apply the transfer function to the digital output signal. The normalisation unit 24 is connected with the tracking unit 25.

It is further possible to employ a comparator unit 27 without a normalisation unit 24 and a tracking unit 25 in a processing unit 33, which is not shown.

Figure 4:
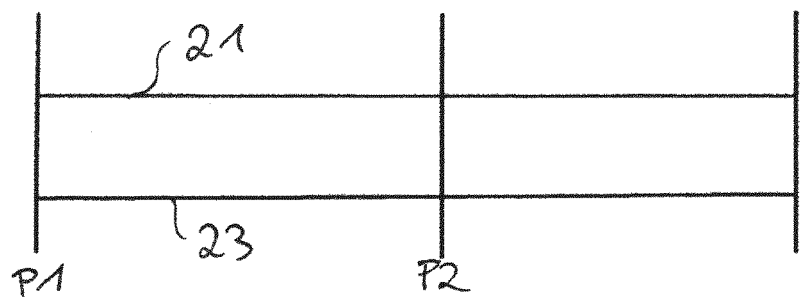

In FIG. 4 the linear asset 21 and the distributed sensor 23 arranged along the linear asset 21 are shown schematically. Both the linear asset 21 and the distributed sensor 23 have the shape of a straight line. Therefore, in this case the linear asset 21 and the distributed sensor 23 have the same length. If noise is detected at a second position P2 along the distributed sensor 23, the noise is present at the second position P2 along the linear asset 21 as well. This means, the distance between the second position P2 and a first position P1 is the same for the linear asset 21 and the distributed sensor 23.

Figure 5:
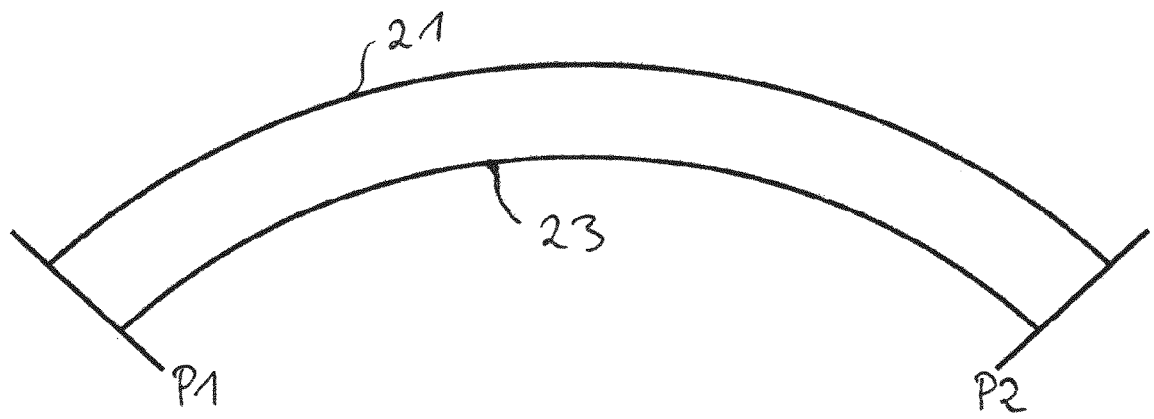

In FIG. 5 the linear asset 21 and the distributed sensor 23 arranged along the linear asset 21 are shown schematically. Both the linear asset 21 and the distributed sensor 23 extend along a curve. Therefore, the length of the linear asset 21 is longer than the length of the distributed sensor 23. This means, a second position P2 along the distributed sensor 23 is arranged at a given distance from the first position P1. For the linear asset 21 the distance between the first position P1 and the second position P2 is larger than for the distributed sensor 23. Thus, for relating noise detected along the distributed sensor 23 to a position along the linear asset 21 the data signal needs to be normalised with respect to the length of the linear asset 21.

Figure 6:
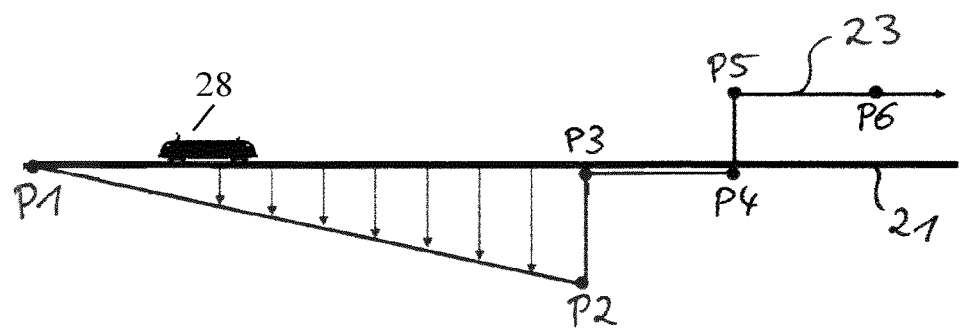

With FIG. 6 it is shown that the distance between the linear asset 21 and the distributed sensor 23 can vary. The linear asset 21 extends as a straight line. The distributed sensor 23 is arranged along the linear asset 21, but the distance between the linear asset 21 and the distributed sensor 23 varies over the length of the linear asset 21. Between a first position P1 and a second position P2 the distributed sensor 23 extends under an angle with respect to the linear asset 21. Therefore, the amplitude of the backscattered signal which relates to the rail vehicle 28 moving along the linear asset 21 is reduced at the second position P2 in comparison to the first position P1 because of the increased distance between the linear asset 21 and the distributed sensor 23. Between the second position P2 and a third position P3 the length of the linear asset 21 does not increase, but the length of the distributed sensor 23 increases. Between the third position P3 and a fourth position P4 the distributed sensor 23 extends parallel to the linear asset 21. Between the fourth position P4 and a fifth position P5 the length of the distributed sensor 23 increases, whereas the length of the linear asset 21 does not increase. Between the fifth position P5 and a sixth position P6 the distributed sensor 23 extends parallel to the linear asset 21. Furthermore, between the fifth position P5 and the sixth position P6 the distance between the linear asset 21 and the distributed sensor 23 is larger than between the third position P3 and the fourth position P4.

Therefore, for a rail vehicle 28 moving between the fifth position P5 and the sixth position P6 the amplitude of the detected backscattered signal is smaller than for the same rail vehicle 28 moving between the third position P3 and the fourth position P4. The variation in the distance between the linear asset 21 and the distributed sensor 23 shows why the accuracy of monitoring the linear asset 21 is improved by normalising the data signal with respect to the distance between the linear asset 21 and the distributed sensor 23.

Figure 7:
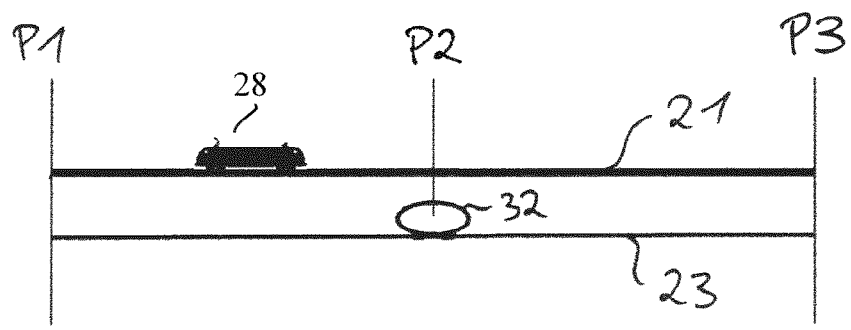

In FIG. 7 the linear asset 21 has the shape of a straight line. The distributed sensor 23 extends parallel to the linear asset 21. At a second position P2 along the distributed sensor 23, the optical fibre 26 of the distributed sensor 23 is arranged as a loop. Therefore, the length of the distributed sensor 23 between the first position P1 and the third position P3 is longer than the length of the linear asset 21, even though the distributed sensor 23 runs parallel to the linear asset 21. The loop of the optical fibre 26 can be a spare section 32 of the distributed sensor 23 which could be used in construction or for repairing the optical fibre 26. In order to normalise the data signal with respect to the length of the linear asset 21, for example the amplitude values detected in the loop can be deleted.

With FIG. 8 a step of an exemplary embodiment of the method for monitoring the linear asset 21 is described. According to the embodiment of FIG. 8 the transfer function is applied to the data signal in order to normalise the data signal with respect to the length of the linear asset 21. The transfer function is an allocation table shown in the matrix in the center of FIG. 8. The left hand side matrix in FIG. 8 comprises two columns and shows the detection of the data signal. In the first column, positions P along the distributed sensor 23 are given. In the second column, the distance ds along the distributed sensor 23 given from an initial position 1 is provided for each position P. In this embodiment, applying the transfer function to the data signal comprises assigning a normalisation factor n to each position. In the matrix in the center the positions P and the normalisation factors n are given. Each normalisation factor n correlates a distance ds along the distributed sensor 23 with the respective closest position along the linear asset 21. In the right hand side matrix the result of applying the transfer function is shown. For each position P the distance along the linear asset 21, at which the data signal is detected, is given. This means, each distance ds along the distributed sensor 23 is assigned the respective distance along the linear asset 21. These distances are different from each other for example because the distributed sensor 23 does not run in all places parallel to the linear asset 21. In this way, by applying the transfer function the data signal is normalised with respect to the length of the linear asset 21.

With FIG. 9 a step of another exemplary embodiment of the method for monitoring the linear asset 21 is described. According to the embodiment of FIG. 9 the transfer function is applied to the data signal in order to normalise the data signal with respect to the length of the linear asset 21. The transfer function is a table comprising the normalisation factors n. The left hand side matrix is identical to the left hand side matrix shown in FIG. 8. In the second column of the matrix in the center for each position P the difference between the distance between two positions along the linear asset 21 and the distance between the two positions along the distributed sensor 23 that are the closest to the two positions along the linear asset 21 are given. This means, the normalisation factor n in the second column shows the deviation of the length of the distributed sensor 23 from the length of the linear asset 21 for each position P. In the right hand side matrix the same result as in FIG. 8 is given. For each position P the data signal is assigned to the respective closest position along the linear asset 21. This means, the data signal is normalised with respect to the length of the linear asset 21.

With FIG. 10 a step of another exemplary embodiment of the method for monitoring the linear asset 21 is described. According to the embodiment of FIG. 10 the transfer function is applied to the data signal in order to normalise the data signal with respect to the length of the linear asset 21, and with respect to the acoustic frequency response function of the environment of the linear asset 21. The amplitude of the data signal detected by the distributed sensor 23 depends, among other factors, on the distance of the distributed sensor 23 from the linear asset 21. The amplitude of an acoustic signal originating at the linear asset 21 is reduced at the position of the distributed sensor 23. The damping of the amplitude depends on the distance between the linear asset 21 and the distributed sensor 23. In this example it is assumed that the condition of the ground between the linear asset 21 and the distributed sensor 23 is homogeneous. It is further assumed that the amplitude of the acoustic signal originating at the linear asset 21 is reduced by 60 dB per 100 m. Therefore, the amplitude $A_p(x)$ of an acoustic signal detected by the distributed sensor 23 can be calculated for the position of the linear asset 21 as follows:

$$A_P(x) = A * 10^{-\frac{x\frac{60}{100}}{20}}$$

where A is the amplitude of the data signal detected by the distributed sensor 23 and x is the distance between the linear asset 21 and the distributed sensor 23.

FIG. 10 shows an example of the calculation of the amplitude of the acoustic signal. The left-hand side matrix comprises four columns. The first two columns are the same as the two columns of the left-hand side matrix in FIG. 8. The third column gives the distance x between the linear asset 21 and the distributed sensor 23. The fourth column gives the amplitude A of the data signal detected by the distributed sensor 23. The matrix in the center shows the application of the transfer function. The first column gives the positions P along the distributed sensor 23. The second column gives normalisation factors nd for the difference between the length of the linear asset 21 and the distributed sensor 23 at the respective positions P. The normalisation factors nd are determined in such a way that they give for each position P the difference between the length of the linear asset 21 and the distributed sensor 23. The third column gives normalisation factors nA for the normalisation of the amplitude. For each position P the product of the amplitude A given in the fourth column of the left-hand side matrix and the normalisation factor nA given in the third column of the matrix in the center gives the amplitude of the acoustic signal at the position of the linear asset 21. The right-hand side matrix shows the result of applying the transfer function to the data signal. The first column gives the positions P along the distributed sensor 23. The second column gives the same values for the distance along the linear asset 21 as shown in the right-hand side matrix in FIGS. 8 and 9. The third column gives the amplitude of an acoustic signal at the position of the linear asset 21. Consequently, the data signal is normalised with respect to the length of the linear asset 21, and with respect to the acoustic frequency response function of the environment of the linear asset 21.

In all embodiments shown above the transfer function can be multidimensional and can comprise a correction formula or equations depending on multiple factors. The transfer function can further depend on different factors that are different for each position along the distributed sensor 23. In addition, changes over time can be considered in the transfer function.

It is further possible that the transfer function includes functions to reduce or increase the number of positions P along the distributed sensor 23 that are taken into account by the transfer function. For this purpose, individual positions P can be eliminated or several positions P can be aggregated or interpolated. The number of factors that are normalised can be adapted.

What is claimed is:

1. A monitoring unit for monitoring a linear asset, the monitoring unit comprising:
    a connection to a data output of a distributed sensor arranged along the linear asset, where the linear asset has a length which is different from the length of the distributed sensor; and
    a processing unit which is configured to receive a data signal provided by the distributed sensor, to apply a transfer function, to evaluate the data signal and to provide a tracking output signal;
    wherein:
        evaluating the data signal comprises running an evaluation algorithm;
        the transfer function is applied to the data signal or to the evaluation algorithm;
        by applying the transfer function, the data signal or the evaluation algorithm is normalized with respect to an acoustic frequency response function of an environment of the linear asset;
        by applying the transfer function, the data signal is normalized with respect to a distance between the linear asset and the distributed sensor; and
        the transfer function comprises information about the distance between the distributed sensor and the linear asset for a plurality of positions along the linear asset.

2. The monitoring unit according to claim 1, wherein the transfer function comprises normalization factors for normalizing the data signal or the evaluation algorithm.

3. The monitoring unit according to claim 2, wherein the normalization factors of the transfer function are determined in such a way that by applying the transfer function, the data signal or the evaluation algorithm is normalized with respect to the length of the linear asset; or the normalization factors of the transfer function are determined in such a way that by applying the transfer function, the data signal or the evaluation algorithm is normalized with respect to the acoustic frequency response function of the environment of the linear asset.

4. The monitoring unit according to claim 1, wherein by applying the transfer function, the data signal is normalized with respect to the length of the linear asset.

5. The monitoring unit according to claim 1, wherein the transfer function is formed with values from a normalization database, and the normalization database comprises information about the acoustic frequency response function of the environment of the linear asset.

6. The monitoring unit according to claim 1, wherein the distributed sensor is a distributed acoustic sensor.

7. The monitoring unit according to claim 1, wherein the distributed sensor comprises an optical fiber, and the data signal is a backscattered signal of an input signal which is provided to the optical fiber.

8. The monitoring unit according to claim 1, wherein the tracking output signal comprises information about noise along the linear asset.

9. The monitoring unit according to claim 1, wherein the linear asset is one of a railway track, a pipeline, a road, or a fence.

10. The monitoring unit according to claim 1, wherein the processing unit is capable of providing a current position of an object moving along the linear asset.

11. The monitoring unit according to claim 1, wherein the data signal comprises position information which relates to positions along the distributed sensor, and the tracking output signal comprises normalized position information which relates to positions along the linear asset.

12. The monitoring unit according to claim 1, wherein the data signal comprises an array of amplitude values, where each amplitude value relates to one position along the distributed sensor.

13. The monitoring unit according to claim 12, wherein the distributed sensor comprises at least one spare section; and wherein normalizing the data signal with respect to the length of the linear asset comprises discarding the amplitude values which relate to the at least one spare section of the distributed sensor.

14. The monitoring unit according to one of the claim 12 or 13, wherein the tracking output signal comprises an array of normalized amplitude values, where each normalized amplitude value relates to one position along the linear asset.

15. The monitoring unit according to claim 1, wherein the linear asset is different from the distributed sensor.

16. A method for monitoring a linear asset, the method comprising the steps of:
    detecting a data signal by a distributed sensor which is arranged along the linear asset, where the linear asset has a length which is different from the length of the distributed sensor;
    receiving the data signal by a processing unit;
    applying a transfer function;
    evaluating the data signal;
    providing a tracking output signal by the processing unit;
    wherein:
        evaluating the data signal comprises running an evaluation algorithm;
        the transfer function is applied to the data signal or to the evaluation algorithm;
        by applying the transfer function, the data signal or the evaluation algorithm is normalized with respect to an acoustic frequency response function of an environment of the linear asset;
        by applying the transfer function, the data signal is normalized with respect to a distance between the linear asset and the distributed sensor; and
        the transfer function comprises information about the distance between the distributed sensor and the linear asset for a plurality of positions along the linear asset.

17. The method for monitoring a linear asset according to claim 16, wherein by applying the transfer function, the data signal or the evaluation algorithm is normalized with respect to at least one of the following:
    the length of the linear asset; and
    a distance between the linear asset and the distributed sensor.

18. A monitoring unit for monitoring a linear asset, the monitoring unit comprising:
    a connection to a data output of a distributed sensor arranged along the linear asset, where the linear asset has a length which is different from the length of the distributed sensor; and
    a processing unit which is configured to receive a data signal provided by the distributed sensor, to apply a transfer function, to evaluate the data signal and to provide a tracking output signal;
    wherein:
        evaluating the data signal comprises running an evaluation algorithm;
        the transfer function is applied to the data signal or to the evaluation algorithm;
        by applying the transfer function, the data signal or the evaluation algorithm is normalized with respect to an acoustic frequency response function of an environment of the linear asset; and
        the evaluation algorithm is an adaptive algorithm which is capable of distinguishing repeating features in the data signal.

\* \* \* \* \*

UNITED STATES PATENT AND TRADEMARK OFFICE
CERTIFICATE OF CORRECTION

| | | |
|---|---|---|
| PATENT NO. | : 11,674,826 B2 | |
| APPLICATION NO. | : 15/733849 | |
| DATED | : June 13, 2023 | |
| INVENTOR(S) | : Martin Rosenberger | |

It is certified that error appears in the above-identified patent and that said Letters Patent is hereby corrected as shown below:

On the Title Page

Item (30), Foreign Application Priority Data, should read:
--Jun. 1, 2018 (EP) ...................... 18175568--

Signed and Sealed this
Twenty-sixth Day of September, 2023

*Katherine Kelly Vidal*

Katherine Kelly Vidal
*Director of the United States Patent and Trademark Office*